(12) United States Patent
Foglia

(10) Patent No.: US 8,336,848 B2
(45) Date of Patent: Dec. 25, 2012

(54) ON-OFF FLOW VALVE

(75) Inventor: Andrea Foglia, Carbonate (IT)

(73) Assignee: R.P.E. S.r.l., Carbonate (IT)

( * ) Notice: Subject to any disclaimer, the term of this patent is extended or adjusted under 35 U.S.C. 154(b) by 283 days.

(21) Appl. No.: 12/741,698

(22) PCT Filed: Nov. 7, 2008

(86) PCT No.: PCT/IB2008/003007
§ 371 (c)(1),
(2), (4) Date: Sep. 14, 2010

(87) PCT Pub. No.: WO2009/060302
PCT Pub. Date: May 14, 2009

(65) Prior Publication Data
US 2012/0138828 A1    Jun. 7, 2012

(30) Foreign Application Priority Data
Nov. 8, 2007 (IT) .............................. MI2007A2138

(51) Int. Cl.
*F16K 31/12* (2006.01)
(52) U.S. Cl. ..................................... 251/30.03; 251/367

(58) Field of Classification Search ............... 251/30.01, 251/30.02, 30.03, 367, 129.15
See application file for complete search history.

(56) References Cited

U.S. PATENT DOCUMENTS

| | | | |
|---|---|---|---|
| 3,620,244 A | | 11/1971 | Nisley |
| 4,921,206 A | * | 5/1990 | Dunstan et al. .................... 251/7 |
| 4,922,955 A | | 5/1990 | Uri |
| 5,002,086 A | * | 3/1991 | Linder et al. ................... 137/312 |
| 5,881,757 A | * | 3/1999 | Kuster et al. ............... 137/15.19 |
| 6,290,203 B1 | | 9/2001 | Kolze .......................... 251/30.03 |
| 6,405,766 B1 | * | 6/2002 | Benjey .......................... 141/198 |
| 6,892,998 B2 | * | 5/2005 | Newton ..................... 251/149.1 |
| 2010/0288961 A1 | * | 11/2010 | Weh ............................. 251/367 |

FOREIGN PATENT DOCUMENTS
EP    0 549 397 A    6/1993

* cited by examiner

*Primary Examiner* — John K Fristoe, Jr.
*Assistant Examiner* — Umashankar Venkatesan
(74) *Attorney, Agent, or Firm* — Gottlieb, Rackman & Reisman, P.C.

(57) ABSTRACT

An on-off flow valve extends along an axis and has a valve body through which a supply duct and a delivery duct pass; a main shutter assembly; and a cover fitted to the valve body by means of a snap-on coupling system.

10 Claims, 2 Drawing Sheets

ON-OFF FLOW VALVE

TECHNICAL FIELD

The present invention relates to an on-off flow valve.

In particular the present invention relates to an on-off liquid flow valve, which extends along an axis and comprises a valve body through which a supply duct and a delivery duct pass; a cover fitted to the valve body; and a shutter assembly.

BACKGROUND ART

On-off valves of the type specified above are widely used in the household appliances industry and domestic water supply systems.

In this type of valve the cover is usually connected to the valve body by means of screws. Moreover, valves of the known type and of the kind described above comprise a large number of components. The market for this type of valve is constantly demanding smaller valves which make the methods and procedures involved in assembling said valves more and more complicated.

In valves of relative simple structure the cover and the valve body are connected by means of a snap-on coupling system such as disclosed in U.S. Pat. No. 6,405,766 B1 and U.S. Pat. No. 3,620,244 A. However, in many cases it becomes difficult to place in the correct position additional components between the cover and the valve body.

DISCLOSURE OF INVENTION

The purpose of the present invention is to produce an on-off flow valve that overcomes the drawbacks of the prior art and that, in particular, is especially easy to assemble despite its very small size and its complicated structure.

According to the present invention there is provided an on-off liquid flow valve, which extends along an axis and comprises a valve body through which a supply duct and a delivery duct pass; a cover fitted to the valve body; a main shutter assembly; and an internal body arranged inside the valve body and blocked between the valve body and the cover; said shutter assembly being blocked between the internal body and the valve body, wherein the valve body and the cover are connected by means of a snap-on coupling system; the on-off valve being characterised by comprising a control device and an auxiliary duct suitable to place the supply duct in communication with the delivery duct; an auxiliary shutter controlled directly by the control device; the auxiliary duct extending through the shutter assembly, the internal body and the valve body and comprising an annular groove obtained in said internal body and facing the internal face of a first side wall of the valve body, and a hole obtained in the first side wall arranged in correspondence with the annular groove; said internal body being slidingly connectable along the axis to said first side wall.

In this case despite the auxiliary duct is made inside the internal body and the valve body, the flow along the auxiliary duct is assured irrespective of the indexation of the internal body and the valve body and makes easier and time saving the assembly of the valve.

BRIEF DESCRIPTION OF THE DRAWINGS

Further characteristics and advantages of the present invention will become clear from the following description of a non-limiting embodiment thereof, with reference to the accompanying drawings, in which.

BEST MODE FOR CARRYING OUT THE INVENTION

Figure 1:
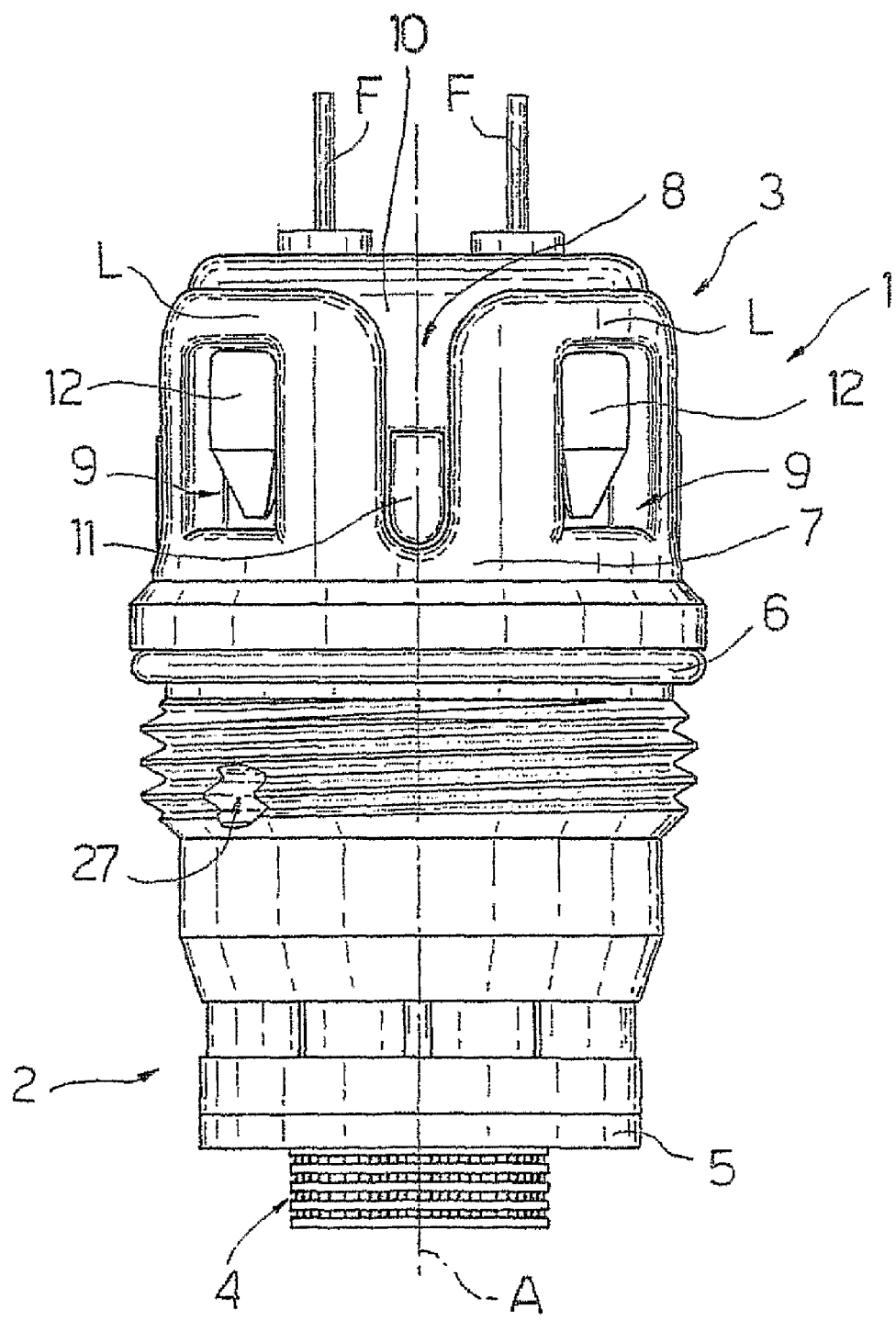
FIG. 1 is a side elevation view, with parts removed for the sake of clarity, of an on-off flow valve in accordance with the present invention.

In FIG. 1 number 1 indicates as a whole an on-off liquid flow valve suitable for use in household appliances and domestic water supply systems. The valve 1 extends along an axis A and comprises a valve body 2; a cover 3 fitted to the valve body 2; a filter 4, which is coupled to the valve body 2, and is suitable to connect the valve body 2 with a supply duct not illustrated in the accompanying drawings; a seal 5 fixed to the filter 4; and a seal 6 fixed to the valve body 2. The valve body 2 has a threaded portion below the seal 6 to connect the valve body 2 to a delivery duct (not illustrated in FIG. 1) and a coupling portion arranged above the seal 6 and suitable to establish a coupling with the cover 3. The valve 1 is an electrically operated valve and comprises electric power supply wires F that pass through the cover 3.

The cover 3 and the valve body 2 are connected by means of a snap-on coupling system. The valve body 2 is substantially tumbler shaped and comprises a side wall 7, which is cylindrical in the example shown, in which guideways 8 are obtained, in the example shown slots parallel to the axis A distributed uniformly about the axis A, and apertures 9. In the specific case the valve body 2 comprises four guideways arranged above the threaded portion and four windows 9 arranged above the threaded portion. Since the guideways 8 are slots that extend from the free end of the side wall 7, a flexible tongue L containing a respective aperture 9 extends between two adjacent guideways 8. The cover 3 is formed in a tumbler shape that is the opposite of the valve body 2 and a side wall 10, that is cylindrical in the example shown, along which projecting members 11 project outwards, each of which is suitable to engage a respective guideway 8, and projecting members 12, each of which is suitable to be snapped into a respective aperture 9 and block the cover 3 in a given position.

Figure 2:
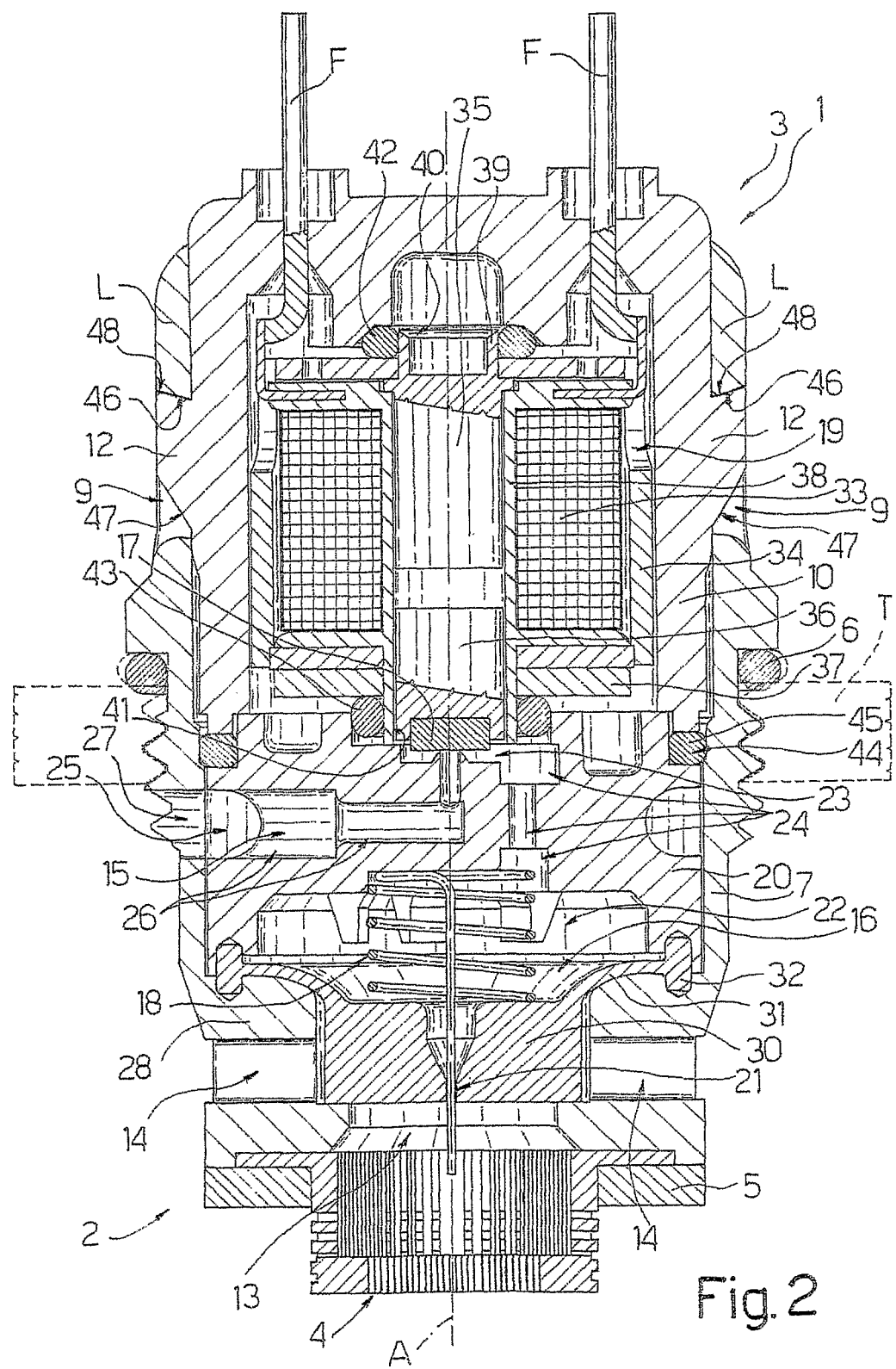
FIG. 2 is a cross-sectional view, with parts removed for the sake of clarity and on an enlarged scale, of the on-off valve of FIG. 1.

With reference to FIG. 2, the valve 1 is illustrated mounted along a wall of a delivery pipe T and comprises an axial supply duct 13; a delivery duct 14 divided into four radial ducts (only two of which are illustrated in FIG. 2) that lead into the delivery pipe T; an auxiliary duct 15 suitable to selectively connect the supply duct 13 with the delivery pipe T; a shutter assembly 16 suitable to selectively close the connection between the supply duct 13 and the delivery duct 14; an auxiliary shutter 17 suitable to selectively close the auxiliary duct 15; a spring 18 suitable to hold the shutter assembly 16 in the closed position and a control device 19 suitable to control the position of the auxiliary shutter 17.

The auxiliary duct 15 extends between the supply duct 13 and the delivery pipe T through the shutter assembly 16; the valve body 2; and an internal body 20, which is arranged between the valve body 2, and the cover 3. The internal body 20 is substantially a cylindrical member that is slidingly connectable to the side wall 7 of the valve body 2 and is arranged between the free end of the side wall 10 of the cover 3 and the valve body 2.

In practice, the auxiliary duct 15 is provided with a hole 21 aligned with the axis A and passing through the shutter assembly 16; a chamber 22 defined by a cavity in the internal body and arranged above the shutter assembly 16; a chamber 23 defined by a cavity arranged below the auxiliary shutter 17 and obtained in the internal body 20; a series of holes 24 that are obtained in the internal body 20 and connect the chamber 22 to the chamber 23; an annular groove 25, which is obtained along the lateral face of the internal body 20 and faces the internal face of the side wall 7 of the valve body 2; two holes 26 which are obtained in the internal body 20 and connect the chamber 23 with the annular groove 25. The auxiliary duct 15 is provided with a hole 27 arranged along the side wall 7 of the valve body 2 at the height of the threaded portion and of the annular groove 25.

The valve body 2 is provided with an annular wall 28, which partially defines the supply duct 13, and through which the delivery duct 14 passes radially.

The shutter assembly 16 is made of rubber and comprises a main disk-shaped shutter 30 suitable to selectively engage a seat communicating with the supply duct 13 and the delivery duct 14; an annular membrane that extends radially from the disk of the main shutter 30; and an annular seal 32 that radially delimits the membrane 31. The main shutter 30, the membrane 31 and the seal 32 are formed from a single rubber piece and in different thicknesses. The seal 32 is arranged in respective annular eats obtained respectively in the annular wall 28 of the valve body 2 and in the internal body 20 and is blocked between the valve body 2 and the internal body 20, while the disk 30 and the membrane 31 are movable in the chamber 22.

The control device 19 comprises a coil 33 wound about the axis A; a magnetic yoke 34 arranged round the coil 33; a core 35 aligned with the axis A; an anchor 36, which is aligned with the core 35 and is integral with the auxiliary shutter 17; and an annular permanent magnet 37 arranged below the magnetic yoke 34 and in contact therewith. The control device 19 is of the bistable type, that is the dimensions of the magnetic yoke 34, of the core 35, of the anchor 36 and of the permanent magnet 37 and their relative positions are selected so that the anchor 36 permanently occupies both the closed position, and the open position in the absence of an electric power supply to the coil 33. In other words, the coil 33 is powered by means of an electric impulse each time a change in the condition of the anchor 36 is necessary, i.e. to open or close the valve 1.

The coil 33 is wound round a cylindrical spool 38 inside which are arranged the core 35 and, slidingly, the anchor 36. The control device 19 is entirely housed inside the cover 3 and is blocked between the internal body 20 and the cover 3. In the example shown, the core 37 has one end 39 housed in an aperture of the spool 38 and in a seat 40 obtained in the cover 3, while on the opposite side the spool 38 has an end 41 housed in the chamber 23 and engaging against the internal body 20. Annular seals 42 and 43 are arranged respectively on the external faces of the ends 39 and 41.

The spring 18 is a helical spring housed in the chamber 22 and compressed between the main shutter 30 and the internal body 20. The spring 18 consists of a wire, which is provided with a helically wound portion and a rectilinear portion arranged in the centre of the spiral aligned with the axis A that extends through the hole 21 of the shutter assembly 16.

The internal body 20 comprises an annular groove 44 in which there is housed a seal 45 and, in part, the end of the side wall 10 that pushes the seal 45 against the internal body 20, which is arranged so as to engage against the annular wall 28 of the valve body 2. The closing force between the valve body 2 and the cover 3 is exchanged between the side wall 7 of the valve body 2 and the side wall 10 of the cover 3. In the example shown, each window 9 is provided with a supporting surface 46 that slants towards the axis A and towards the annular wall 28 of the valve body 2, while each projecting member 12 comprises a chamfer 47 to facilitate the insertion of the projecting member into the window 9 and a supporting surface 48, which, in use, is parallel and in contact with a respective supporting surface 46.

The advantages of the present invention consist in the ease of assembly despite the valve that is described generally having a diameter of between 10 and 25 mm. For example, the main shutter assembly 16 is formed from a single rubber piece; the internal body 20 is slidingly connectable along the axis A to the valve body 2 and is guided by the side wall 7 of the valve body 2; the spool 38 is connectable to the internal body 20; and the cover 3 can be assembled simply by pressing. Since the components are axially symmetrical, at least from a functional perspective, during assembly there is no need to verify the orientation of the various components about the axis A.

These arrangements make it possible to reduce assembly times and reduce inaccuracies during assembly.

During assembly, the cover 3 is pressed to overcome the elastic strength of the seals 32, 42 and 45 and of the tongues L. The pressure exerted on the cover 3 causes the tongues L to bend and the seals 42 and 44 to be squashed. When the projecting members 12 have occupied the apertures 9, the tongues L return to the original position and the cover 3 can be released. The spring-back of the seals 32, 42 and 45 pushes the faces 48 so as to come into contact with the faces 46, which, due to their slant, ensure the effective closing of the valve 1.

Although the present description specifically refers to a bistable on-off valve 1, the present invention also applies to monostable valves and valves without servo control.

The invention claimed is:

1. An on-off liquid flow valve (1) extends along an axis (A) and comprises a valve body (2) through which a supply duct (13) and a delivery duct (14) pass; a cover (3) fitted to the valve body (2); a main shutter assembly (16); and an internal body (20) arranged inside the valve body (2) and blocked between the valve body (2) and the cover (3); said shutter assembly (16) being blocked between the internal body (20) and the valve body (2), wherein the valve body (2) and the cover (3) are connected by means of a snap-on coupling system; the on-off valve being characterised by comprising a control device (19) and an auxiliary duct (15) suitable to place the supply duct (13) in communication with the delivery duct (14); an auxiliary shutter (17) controlled directly by the control device (19); the auxiliary duct (15) extending through the shutter assembly (16), the internal body (20) and the valve body (2) and comprising an annular groove (25) obtained in said internal body (20) and facing the internal face of a first side wall (7) of the valve body (2), and a hole (27) obtained in the first side wall (7) arranged in correspondence with the annular groove (25); said internal body (20) being slidingly connectable along the axis (A) to said first side wall (7).

2. Valve according to claim 1 characterized in that the cover (3) comprises a second side wall (10) slidingly connectable with respect to first side wall (7) one another along the axis (A); one of between the first and the second side wall (7, 10) comprising at least one aperture (9) and one of between the second and the first side wall (10, 7) comprising at least one projecting member (12) selectively engageable in said aperture (9) by means of a snap-on coupling system.

3. Valve according to claim 2, characterized in that the second side wall (10) is insertable inside the first side wall (7); the first side wall (7) being being elastically flexible and comprising said aperture (9); the second side wall (10) comprising said projecting member (12).

4. Valve according to claim 2, characterized in that said aperture comprises a supporting surface (46) arranged transversely with respect to the axis (A) and the projecting member comprises a supporting surface (48) arranged transversely to the axis (A) and, in use, parallel and in contact with the supporting surface (46).

5. Valve according to claim 4, characterized in that the valve body comprises an annular wall (28) adjacent to the first side wall (7); said supporting surfaces (46, 47) slanting towards the axis (A) and towards the annular wall (28).

6. Valve according to claim 2, characterized in that said projecting member (12) comprises a chamfer (47) suitable to facilitate the insertion of the projecting member (12) into the aperture (9) and a supporting surface (48) suitable to be arranged so as to engage against a further supporting surface (46) of the aperture (9).

7. Valve according to claim 2, characterized in that one of between the first and the second side wall (7, 10) comprises a guideway (8) parallel to the axis (A); and one of between the second and the first wall (10, 7) comprises a further projecting member (11) selectively insertable inside the guideway (8).

8. Valve according to claim 7, characterized in that the first side wall (7) comprises said guideway (8); the second side wall (10) comprising said projecting member (11).

9. Valve according to claim 8, characterized in that the first side wall (7) is provided with at least two guideways (8) in the form of grooves parallel to the axis (A) which extend from the free end of the first side wall (7) so as to divide the first side wall (7) into at least two flexible tongues (L).

10. Valve according to claim 1 characterized in that the shutter assembly (16) comprises a main shutter (30) suitable to be selectively arranged in a seat communicating with the supply duct (13) and the delivery duct (14); a membrane (31) integral with the disk (30); and a seal (32) integral with the membrane (31); the disk (30), the membrane (31) and the seal (32) defining a single rubber piece.

\* \* \* \* \*